(12) United States Patent
Basara

(10) Patent No.: US 6,349,841 B1
(45) Date of Patent: Feb. 26, 2002

(54) BOX-LIKE CONTAINER WITH AN INTERPENETRATING STRUCTURE AND PROCESS FOR THE REALIZATION THEREOF

(75) Inventor: Michael Basara, Milan (IT)

(73) Assignee: Immanuel Industrial Co., Ltd., Tainan (TW)

( * ) Notice: Subject to any disclaimer, the term of this patent is extended or adjusted under 35 U.S.C. 154(b) by 0 days.

(21) Appl. No.: 09/468,836

(22) Filed: Dec. 22, 1999

Related U.S. Application Data

(63) Continuation-in-part of application No. 09/324,173, filed on Jun. 3, 1999.

(51) Int. Cl.[7] .............................. B65D 8/00; B29F 1/12
(52) U.S. Cl. ............................... 220/62.12; 220/62.14; 264/273
(58) Field of Search ........................... 220/62.12, 62.13, 220/62.14; 264/273, 274, 246

(56) References Cited

U.S. PATENT DOCUMENTS

| | | |
|---|---|---|
| 2,033,855 A | 3/1936 | Sloan |
| 2,689,424 A | 9/1954 | Clagett |
| 3,086,250 A * | 4/1963 | Gits ........................... 264/247 |
| 3,515,262 A | 6/1970 | Ornstein et al. |
| 4,155,972 A * | 5/1979 | Hauser et al. ............... 264/246 |
| 4,568,597 A | 2/1986 | Williams |
| 4,573,596 A | 3/1986 | Slat |
| 4,828,901 A * | 5/1989 | Wank et al. ................... 428/76 |
| 4,837,892 A | 6/1989 | Lo |
| 5,308,570 A | 5/1994 | Hara et al. |
| 5,464,107 A | 11/1995 | Koeinger |

FOREIGN PATENT DOCUMENTS

| | | |
|---|---|---|
| DE | 567388 | 1/1933 |
| EP | 363557 | 4/1990 |
| FR | 1231866 | 10/1960 |
| FR | 1393493 | 1/1963 |
| FR | 2315246 | 1/1977 |
| FR | 2340193 | 9/1977 |
| GB | 5626 | 5/1885 |
| GB | 1503039 | 3/1978 |
| IT | 317786 | 5/1937 |

* cited by examiner

Primary Examiner—Stephen P. Garbe
Assistant Examiner—Joseph C. Merek
(74) Attorney, Agent, or Firm—Nixon & Vanderhye

(57) ABSTRACT

A box-like hollow body, particularly a container of various shapes and size, comprising at least an inner hollow body 3 and an outer hollow body 2, interpenetrating with each other so as to create an integral structure with particular characteristics of mechanical resistance and ornamental, and provided with a continuous inner surface without gaps and an outer surface patterned according to zones or sections.

2 Claims, 4 Drawing Sheets

Figure 1:
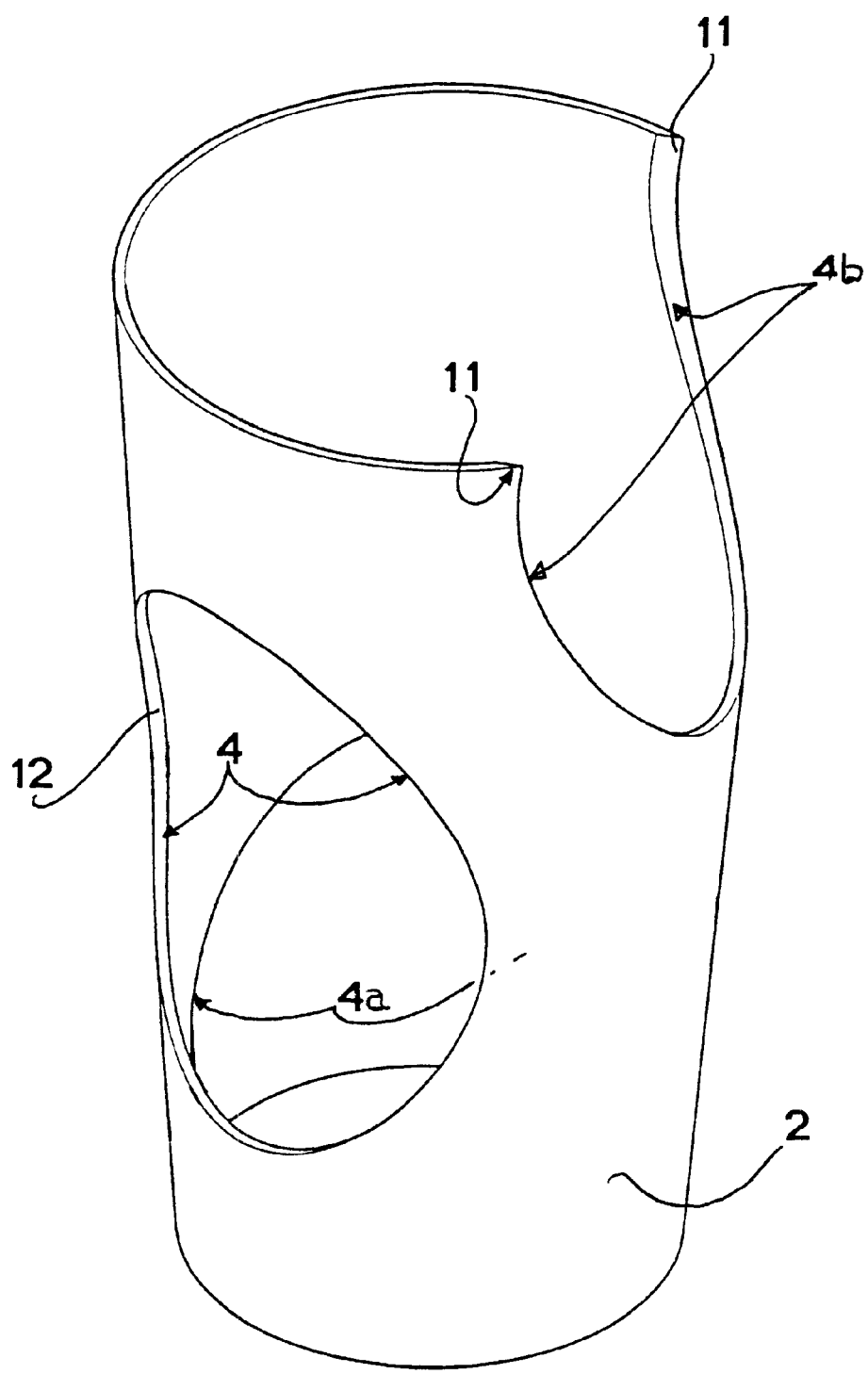

BOX-LIKE CONTAINER WITH AN INTERPENETRATING STRUCTURE AND PROCESS FOR THE REALIZATION THEREOF

This application is a continuation-in-part of Ser. No. 09/324,173 filed Jun. 3, 1999.

The present invention relates to a box-like hollow body, particularly a container of various shapes and size, comprising at least an inner hollow body and an outer hollow body interpenetrating with each other so as to create a structure with particular characteristics of mechanical resistance and ornamental, and provided with a continuous inner surface without gaps and an outer surface patterned according to zones or sections.

The present invention further relates to a process for the realization of said hollow body.

Containers or box-like bodies, in particular containers such as glasses, soup-tureens, jugs, boxes for alimentary products and the like are known that have a double wall and a decoration visible on the surface.

Such box-like bodies are generally constituted by an inner body on whose outer surface a decoration or a pattern is obtained, and by an outer body from transparent material which coats and covers the inner body and which is obtained by casting or injection on or about the inner body. As the external body is realized from transparent material, the decoration or the pattern obtained on the external wall of the inner body is visible in transparency through the thickness of the external body.

To realize such box-like hollow bodies, like plastic material cups or the like, according to the known art, a first shell or hollow body is prepared, for instance by injection. Then, on such first shell a second shell is also realized by injection on the outside or in the inside of the first shell, said second shell being caused to adhere to the wall of the first shell; or, the two shells are prepared separately, so that one of them is exactly contained in the other one, and so molded as to cause the two shells to adhere to one another.

Said known containers have the disadvantage that they are substantially constituted by two containers located one inside the other and that the more external container is made from a transparent material.

Besides, in case of knock or fall of the container, the two bodies tend to detach from one another.

Object of this invention is to provide a box-like hollow body, in particular a container of various shapes and size, provided with an outer surface with variously decorated or colored zones or sectors, perfectly matching with each other and affording an agreeable and original visual effect.

A further object of the invention is to provide a box-like hollow body, made in particular from plastic material, comprising at least two hollow bodies intimately associated to each other, in such a way as not to be detachable from each other because of knocks or other stresses.

These and still other objects and the related advantages that will be made apparent from the following description are achieved by a box-like body, particularly a container of various shapes and size, such as a cup, jar, box, glass, jug and the like, which container, according to the present invention, comprises at least a first outer hollow body and a second inner hollow body, interpenetrating with each other so as to form an integral structure provided with a continuous inner surface without any gaps, and an outer surface with zones or sectors constituted by portions of said second inner hollow body emerging on the surface of said first outer hollow body in such a way as to form a substantially continuous, variously decorated outer surface.

More particularly, said first outer hollow body is provided with apertures such as holes, windows, cuttings and the like, variously located and having various shapes and size, and said second inner hollow body is realized in the inside of said first outer body and is provided with a continuous inner surface and an outer surface having raised portions with shape, size and thickness corresponding to the shape, size and thickness of said apertures, said raised portions being realized within said apertures and peripherally exactly and intimately matching the edge of said apertures.

Besides, the edges of said apertures obtained in said first outer hollow body are preferably realized at an acute angle, so as to ensure a still better interpenetration and coupling stability between said apertures and said raised portions of said second inner hollow body.

The box-like hollow body according to the present invention may be realized from different materials such as, for instance, plastic materials or glass. In particular, any material may be used that is suitable to change its physical state from a flowing fluid during the working step to a solid in the finished product.

Advantageously, a process for the realization of said box-like hollow body comprises the following steps:
  realization of said first outer hollow body provided with said apertures by casting or injection of a first material into a suitable mold having the selected shape,
  casting or injection of a second material, compatible with said first material, into the inside of said first outer hollow body placed in a suitable mold, so that said second material forms said second inner hollow body, filling said apertures and realizing said continuous inner surface and forming an integral structure with said first hollow body.

Figure 2:
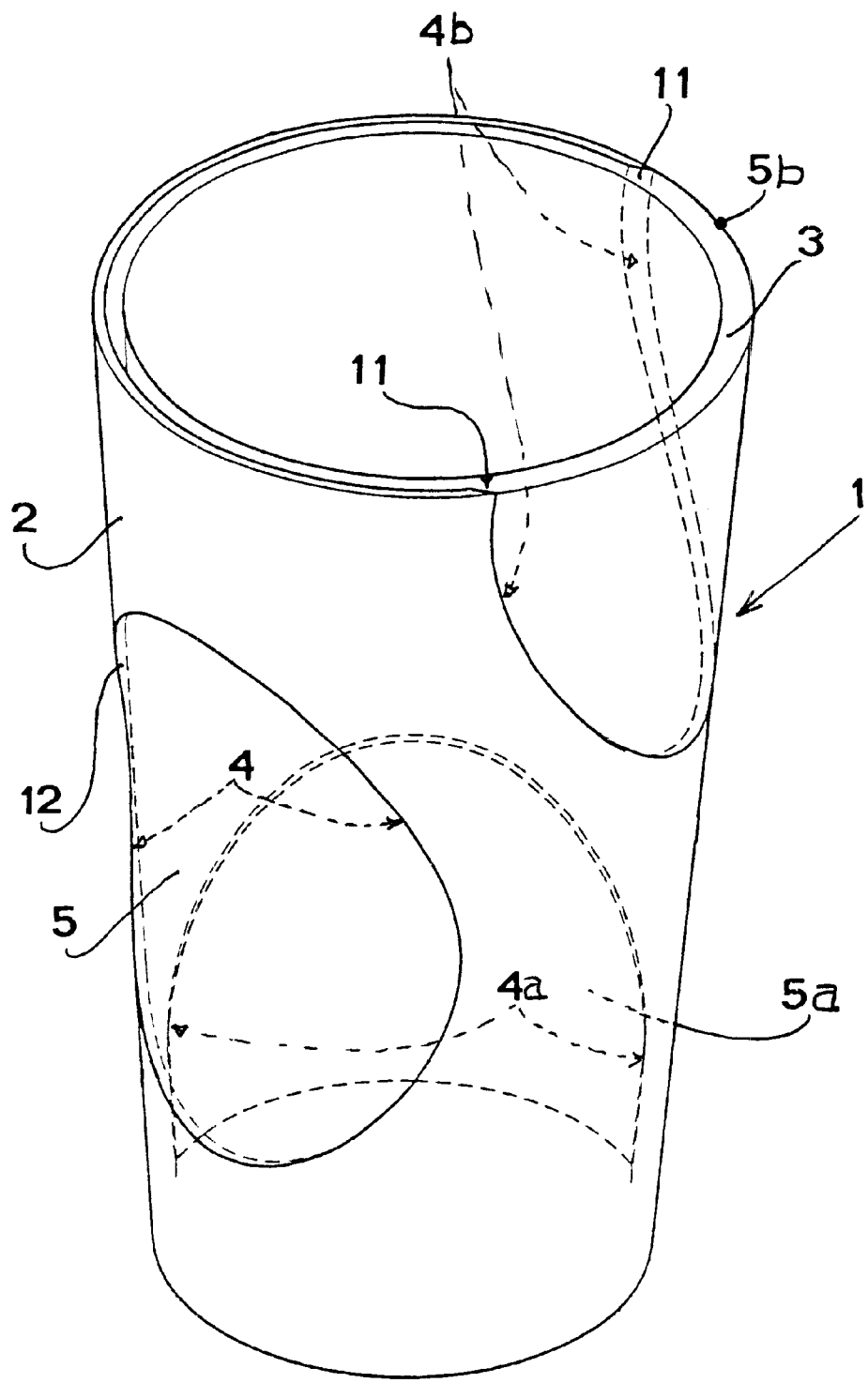
Figure 3:
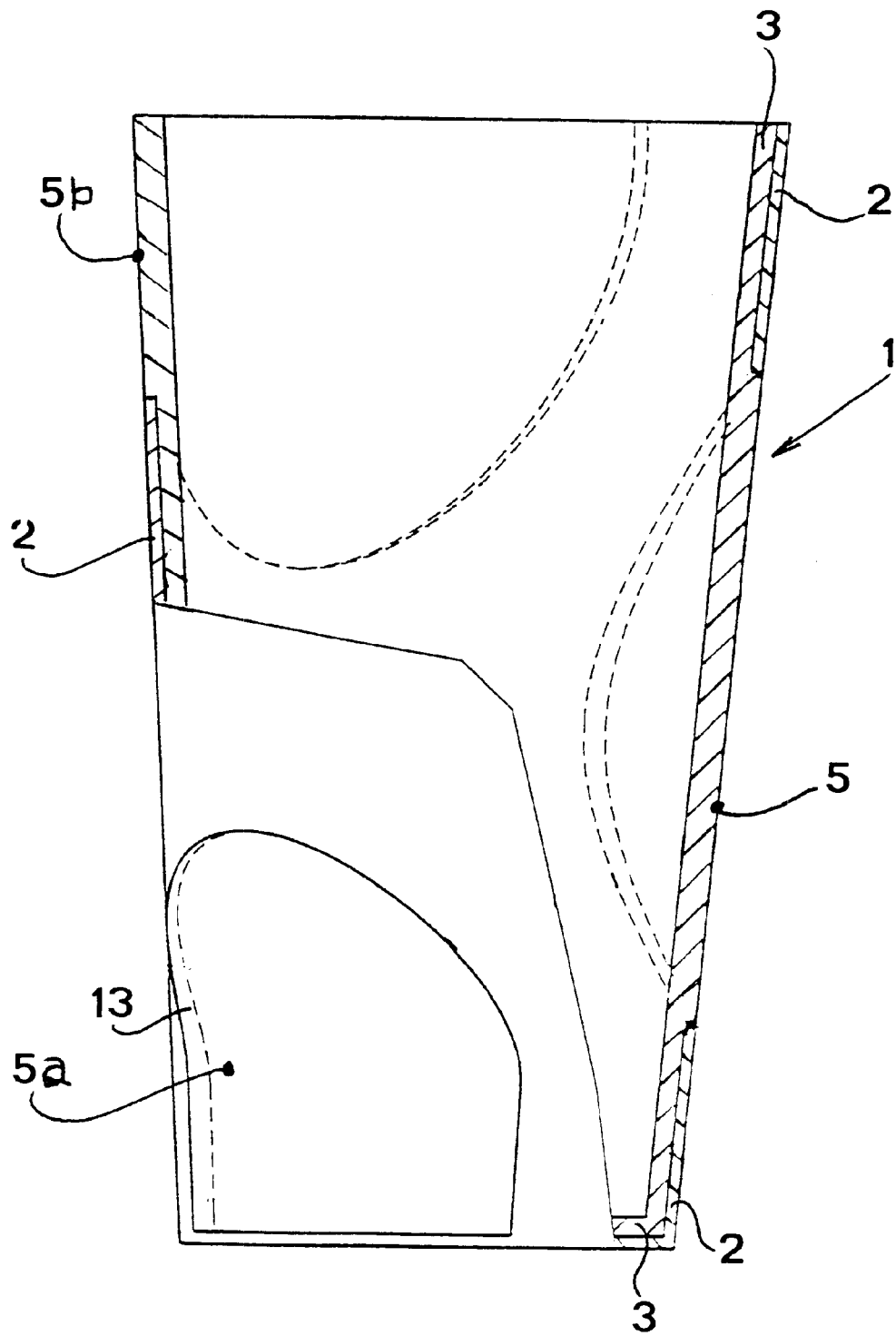
Figure 4:
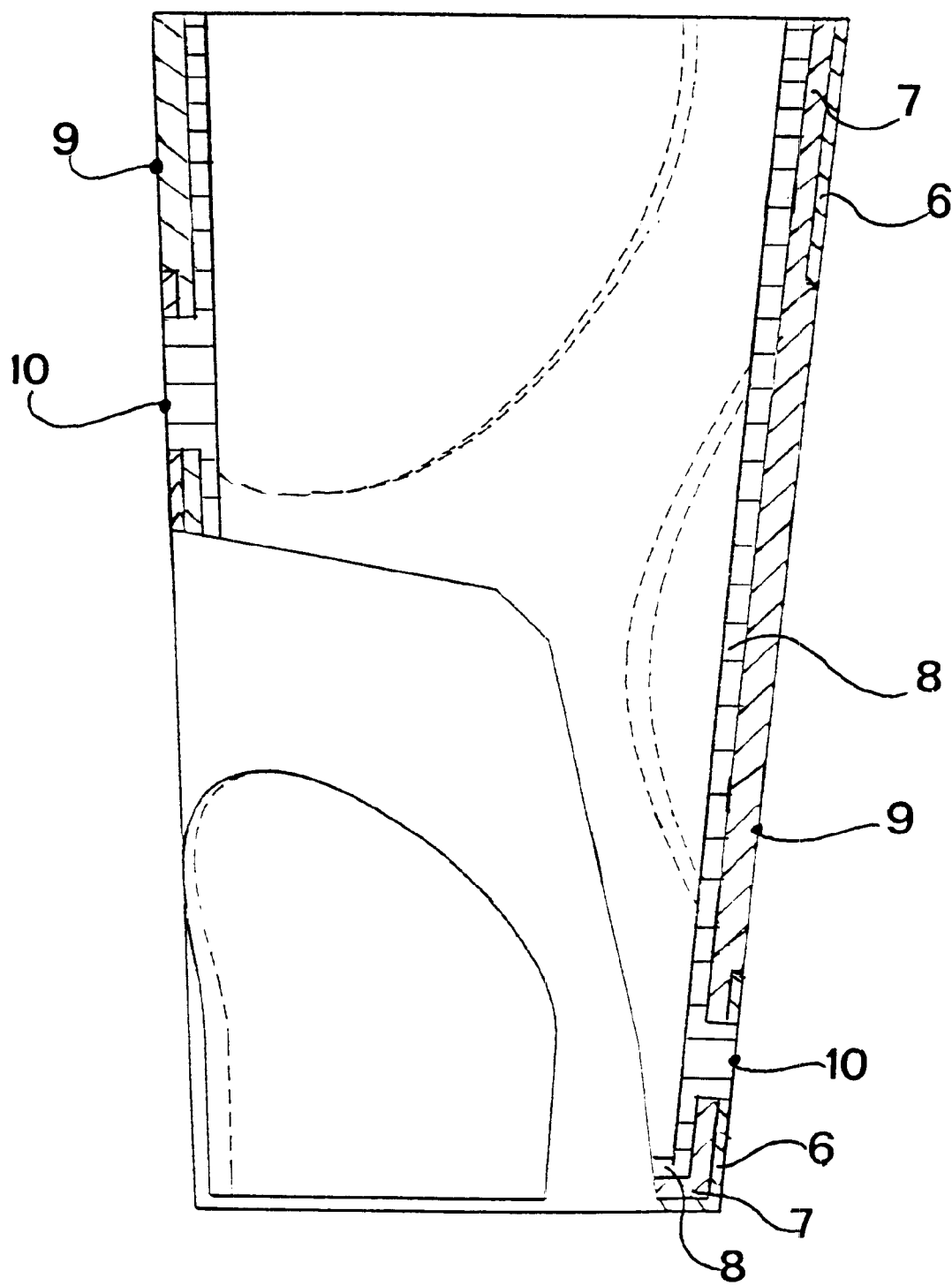

The invention is described hereafter with reference to the attached drawings, reported by way of non limiting illustration of the invention, wherein:

FIG. 1 shows a schematic perspective view of the first hollow body,

FIG. 2 schematically shows the box-like hollow body according to the invention, comprising the first hollow body and the second hollow body, FIG. 3 schematically shows a section of the box-like hollow body of FIG. 2, FIG. 4 schematically shows a section of a variant of the box-like hollow body according to the present invention.

With reference to such figures, the box-like hollow body 1 according to the invention comprises a first outer hollow body 2 and a second inner hollow body 3. The first hollow body 2 is provided with apertures constituted by windows 4 and 4a and by cutting 4b, within which apertures are respectively housed the raised portions 5, 5a and 5b of the second inner hollow body 3.

The edges 11, 12, 13 of the apertures obtained in said first outer hollow body 2 are realized at an acute angle. This realization is possible thanks to the process according to the present invention, and is very advantageous as it ensures a perfect and indissoluble coupling between the first body and the second body.

According to a variant of the present invention, said box-like hollow body, comprises a first outer hollow body 6, a second intermediate hollow body 7 and a third inner hollow body 8.

In this way it is possible to realize an outer surface of the box-like body constituted by zones divided by the emerging on the surface of the outer hollow body 6 of the raised portions 9 of the intermediate hollow body 7 and the raised portions 10 of the inner hollow body 8, obtaining in this way special aesthetic effects.

What is claimed is:

1. A box-shaped hollow container comprising at least a first discrete outer hollow body, a second discrete intermediate hollow body interpenetrating with said first body and a third discrete inner hollow body interpenetrating with said first and second bodies to form an integral container structure, said integral container structure having a continuous inner surface without any gap and an external surface patterned in zones or sections comprising portions of said second intermediate hollow body and said third hollow body emerging through first openings in the first outer hollow body to form a substantially continuous variously decorated outer surface, said first openings being variously located along said outer hollow body and having various shapes and sizes, said second intermediate hollow body being formed along the inside of said first outer body and including an inner surface and an outer surface having raised portions in shapes, sizes and thicknesses corresponding to the shapes, sizes and thicknesses of certain of said first openings, said raised portions being formed within said certain first openings and peripherally exactly and intimately matching the edges of said certain openings, said third inner hollow body being formed along the inside of said second intermediate hollow body and including a continuous inner surface and an outer surface having raised portions in shapes, sizes and thicknesses corresponding to second openings in said second intermediate hollow body and remaining openings of said first openings in said first outer hollow body, said raised portions of said third inner hollow body being formed within said second openings and remaining openings of said first body and peripherally and exactly matching the edges of said remaining openings whereby a smooth continuous outer surface is formed along said container structure, said hollow bodies being both formed of one of glass or plastic material.

2. A container according to claim 1, wherein said edges of said openings form an acute angle at the junction of said edges with an outer surface of said first outer hollow body.

* * * * *